(12) United States Patent
Bentley et al.

(10) Patent No.: US 10,636,074 B1
(45) Date of Patent: Apr. 28, 2020

(54) DETERMINING AND EXECUTING APPLICATION FUNCTIONALITY BASED ON TEXT ANALYSIS

(71) Applicant: Amazon Technologies, Inc., Seattle, WA (US)

(72) Inventors: Peter Van Tuyl Bentley, Seattle, WA (US); Angela Lam, Seattle, WA (US); Michael Douglas McQueen, San Francisco, CA (US); Robert Steven Murdock, Fairfax, CA (US)

(73) Assignee: Amazon Technologies, Inc., Seattle, WA (US)

( * ) Notice: Subject to any disclaimer, the term of this patent is extended or adjusted under 35 U.S.C. 154(b) by 928 days.

(21) Appl. No.: 14/858,972

(22) Filed: Sep. 18, 2015

(51) Int. Cl.
*G06K 9/00* (2006.01)
*G06Q 30/06* (2012.01)
(Continued)

(52) U.S. Cl.
CPC ......... *G06Q 30/0633* (2013.01); *G06F 3/041* (2013.01); *G06F 3/04883* (2013.01); *G06K 9/00422* (2013.01)

(58) Field of Classification Search
CPC .... G06Q 10/10; G06Q 30/0633; G06Q 40/04; G06Q 50/22; G06F 3/041; G06F 3/04883; G06F 3/033; G06F 17/2235; G06F 17/2247; G06F 17/2258; G06F 17/24; G06F 17/241; G06F 17/243; G06F 17/27; G06F 17/2765; G06F 17/28; G06F 17/30011; G06F 17/3002; G06F 17/30038; G06F 17/30247; G06F 17/30265; G06F 17/30619; G06F 17/30861; G06F 17/30876; G06F 17/30058; G06F 17/30253; G06K 9/00422; G06K 9/228; G06K 9/00; G06K 9/00402; G06K 9/00442; G06K 9/00449; G06K 9/00483; G06K 9/2054; G06K 9/2063; G06K 9/222; G06K 9/344; G06K 9/6835; G06K 9/685; G06K 9/72; G06K 17/0016; G06K 11/06; G06K 19/0712; G06K 2209/01; H04N 1/0027; H04N 1/00326; H04N 1/0036; H04N 1/00374; H04N 1/00381; H04N 1/00392; H04N 1/32128; H04N 19/427; H04N 2201/0081; H04N 2201/0438; H04N 2201/3249; H04N 2201/3263; H04N 2201/3266; H04N 2201/3277;
(Continued)

(56) References Cited

U.S. PATENT DOCUMENTS 5,063,600 A * 11/1991 Norwood ................ G06F 3/033
345/173
5,157,384 A * 10/1992 Greanias ................ G06F 3/023
345/156
(Continued)

*Primary Examiner* — Jose L Couso
(74) *Attorney, Agent, or Firm* — Eversheds Sutherland (US) LLP

(57) ABSTRACT

Systems, methods, and computer-readable media are disclosed for detecting handwritten text on a writing surface, determining one or more layout and/or content attributes of the handwritten text, determining application functionality that corresponds to the layout and/or content attribute(s), executing the application functionality to obtain an execution result, and presenting an indication of the execution result on the writing surface in association with at least a portion of the handwritten text.

20 Claims, 7 Drawing Sheets

(51) Int. Cl.
*G06F 3/0488* (2013.01)
*G06F 3/041* (2006.01)

(58) Field of Classification Search
CPC ... H04N 2201/327; G07F 17/40; H04L 51/04; Y10S 707/99931; Y10S 707/99934; Y10S 707/99936; Y10S 707/99943; Y10S 707/99945
See application file for complete search history.

(56) References Cited

U.S. PATENT DOCUMENTS

| | | | | |
|---|---|---|---|---|
| 5,252,951 | A * | 10/1993 | Tannenbaum | G06F 3/023 345/156 |
| 10,133,477 | B1 * | 11/2018 | Zeevi | G06F 3/04883 |
| 10,282,084 | B2 * | 5/2019 | Kwon | G06F 3/04883 |
| 10,387,014 | B2 * | 8/2019 | Kim | G06F 3/04842 |
| 2006/0209175 | A1 * | 9/2006 | Cohen | G06K 9/2081 348/14.01 |
| 2009/0251338 | A1 * | 10/2009 | Marggraff | G06K 9/228 341/20 |
| 2013/0091440 | A1 * | 4/2013 | Kotler | G06Q 10/10 715/753 |
| 2014/0019905 | A1 * | 1/2014 | Kim | G06F 9/451 715/780 |
| 2014/0089841 | A1 * | 3/2014 | Kim | G06F 3/04883 715/780 |
| 2014/0089855 | A1 * | 3/2014 | Kim | G06F 3/0482 715/835 |
| 2014/0245137 | A1 * | 8/2014 | Kim | G06F 17/241 715/268 |
| 2014/0363083 | A1 * | 12/2014 | Xia | G06K 9/00436 382/189 |
| 2015/0036928 | A1 * | 2/2015 | Sheth | G06K 9/00442 382/187 |
| 2016/0350273 | A1 * | 12/2016 | Chan | G06F 17/242 |

* cited by examiner

DETERMINING AND EXECUTING APPLICATION FUNCTIONALITY BASED ON TEXT ANALYSIS

BACKGROUND

A user may access an executable application and/or a network service to perform one or more tasks. For example, a user may utilize a calendaring application to create and manage meetings or appointments. As another example, a user may utilize a shopping application to browse for and purchase products. The onus is typically on the user to identify the particular application to use to complete a task and launch the application to perform the task.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
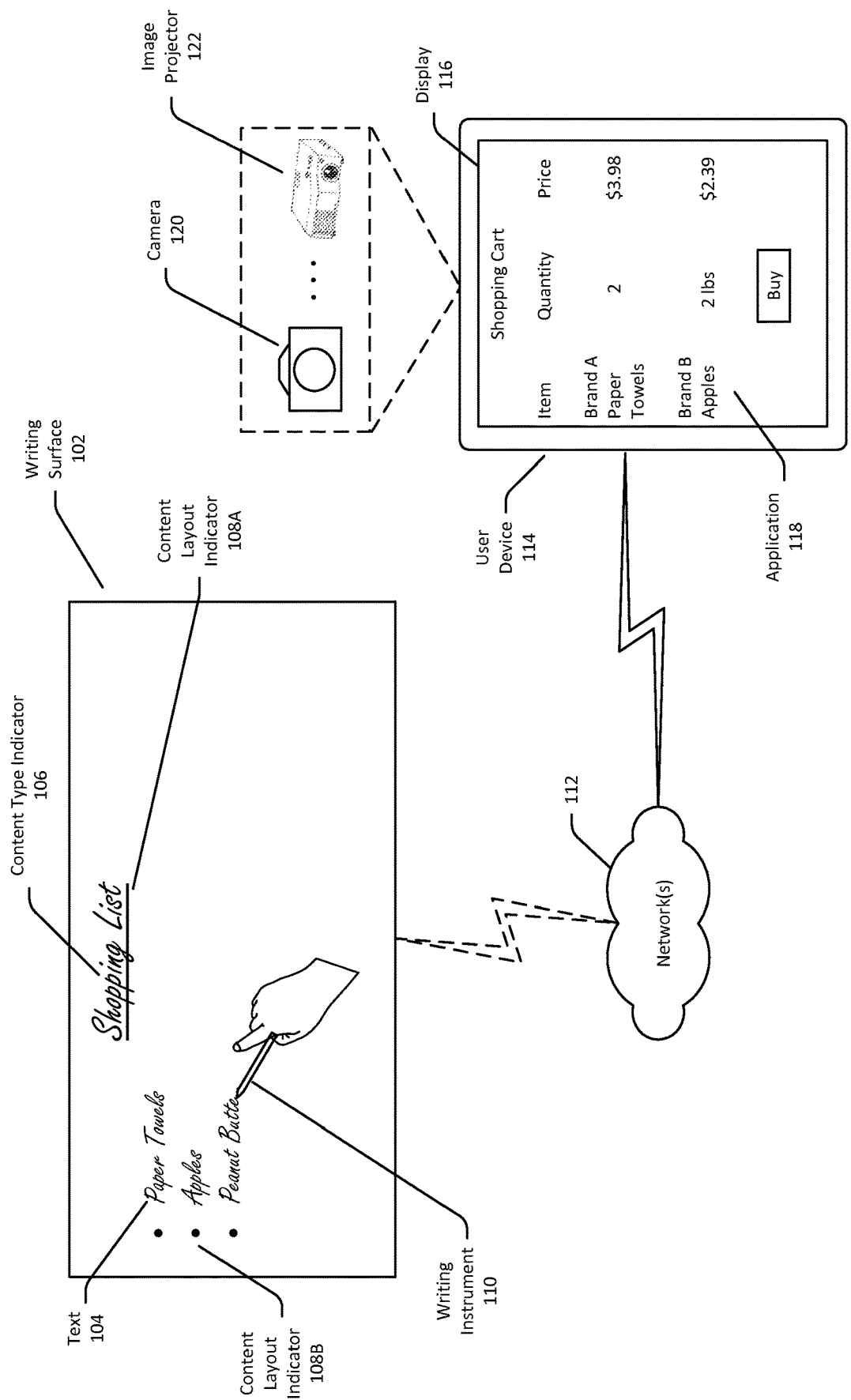
FIG. 1 is a schematic diagram illustrating detection of handwritten text on a writing surface and execution of application functionality corresponding to the handwritten text in accordance with one or more example embodiments of the disclosure.

This disclosure relates to, among other things, systems, methods, and computer-readable media for detecting handwritten text on a writing surface, determining one or more layout and/or content attributes of the handwritten text, determining application functionality that corresponds to the layout and/or content attribute(s), executing the application functionality to obtain an execution result, and presenting an indication of the execution result on the writing surface in association with at least a portion of the handwritten text.

In certain example embodiments, the writing surface may be a physical, non-electronic surface such as, for example, a paper surface, an erasable whiteboard, or the like. In such example embodiments, a standard writing instrument (e.g., a marker, a pencil, a pen, etc.) may be used to generate handwritten text on the writing surface. The handwritten text may include one or more characters, where each character may correspond to a grapheme, a grapheme-like unit, or a symbol, such as in an alphabet or syllabary in the written form of a natural language. For example, characters may include letters, numerical digits, punctuation marks, or the like. The handwritten text may further include any symbol that conveys information regarding the text such as a symbol that is associated with one or more characters in the text. For example, the handwritten text may include a graphical indicator associated with another portion of the handwritten text such as underlining of text; a bullet point, dash, or the like used to delineate a particular text line; a shape (e.g., a rectangle, circle, etc.) that encompasses one or more characters of the text; and so forth.

A user device may be provided that may include or may otherwise be operatively coupled to a camera. The user device may be a smartphone device, a tablet device, a wearable computing device, or a device designed for non-mobile use that may enable voice-based and/or touch-based interactions with a user. The camera may capture an image of the writing surface having the handwritten text thereon. The image may be a still image or an image frame of a video feed of the writing surface captured by the camera.

The user device may then perform optical character recognition (OCR) processing or the like on the image to detect the handwritten text in the image. The user device may further execute natural language processing on the handwritten text in the image to determine one or more layout and/or content attributes of the text. Alternatively, in certain example embodiments, the user device may send the OCR results to a remote system including one or more servers which may, in turn, execute the natural language processing on the text. In still other alternative example embodiments, the user device may send the image to the remote system, and the remote system may both execute the OCR processing on the image to detect the handwritten text and execute the natural language processing on the detected text. In yet other example embodiments, the user device and the remote system may together perform the OCR processing and/or the natural language processing in a distributed manner.

In other example embodiments, the writing surface may be an electronic display configured to receive input data and display output data. For example, the electronic display may include a resistive and/or a capacitive touch sensor configured to detect and interpret touch events at the display. The touch events may include, for example, contact between a user's hand and a display surface of the electronic display, contact between an input device and the display surface of the electronic display, or the like. The input device may be, for example, a stylus or other input device that may be used to provide input data to an electronic display that is representative of handwritten text. In certain example embodiments, the electronic display may form part of the user device mentioned earlier. In other example embodiments, the electronic display may be a separate display from the user device but may be communicatively coupled to the user device via a direct wired connection or via one or more wired and/or wireless networks.

As previously noted, the user device and/or the remote system may perform natural language processing on the detected handwritten text to identify one or more layout and/or content attributes of the text. The layout attribute(s) may include, for example, one or more content layout indicators present in the handwritten text that indicate a format or organization of the text on the writing surface. A content layout indicator may include, for example, a graphical indicator (e.g., an underline, a bullet point, a dash, etc.) included in the detected handwritten text. The content layout indicator may be associated with a particular text line in the detected text or with one or more characters forming a portion of a text line.

The content attribute(s) may include one or more content type indicators and/or one or more application function indicators. A content type indicator may be, for example, a particular keyword or a set of keywords present in the detected handwritten text. For example, the handwritten text may include a text line that includes the keyword "shopping" or the keyword "grocery." Such a content type indicator may indicate—potentially along with one or more content layout indicators—that the handwritten text (e.g., additional lines of text below the text line) represents a listing of types of items to be acquired (e.g., a shopping list). It should be appreciated that a location of a particular character, word, or line of text in the detected handwritten text in relation in another character, word, or line of text may be determined based on reference directions associated with the writing surface that includes the handwritten text. In other example embodiments, the handwritten text may include a text line that includes the keyword "invite." Such a content type indicator may indicate—potentially along with one or more content layout indicators—that the handwritten text represents a listing a potential invitees to event or gathering.

In certain example embodiments, a content type indicator may not be present in the detected handwritten text, but a content attribute of the detected text may nonetheless be determined. In particular, semantic language processing may be executed on the handwritten text to determine common attribute(s) of different portions of the text. For example, semantic language processing may indicate that multiple portions of the text (e.g., text lines) each correspond to different types of items available for acquisition (e.g., a shopping list), different tasks to be performed (e.g., a to-do list), and so forth.

An application function indicator may be, for example, a graphical indicator present in the detected text that indicates a particular application function to be performed with respect to at least a portion of the detected text. For example, an application function indicator may be a particular character (e.g., "?") that indicates that a search function is to be performed. A search query may be generated based on one or more characters associated with the application function indicator in the detected text. For example, if the detected text includes the phrase "Concerts this weekend?," a search query may be generated to locate information relating to concerts occurring in a particular geographic area over a date range indicated by the phrase "this weekend." The relevant geographic area may be determined from address information associated with a user profile, from Global Positioning System (GPS) coordinates of the user device, or the like. In certain example embodiments, as in the above example, the search query may include a portion of the detected text associated with the search function indicator (e.g., the word "concerts"). In other example embodiments, the search query may include a word or phrase that is not in the detected text associated with the search function indicator, but that is representative of the detected text and that is chosen to optimize the search results obtained. For example, if the detected text includes the phrase "Things to do this weekend?," the search query may include the word "event" because this word may be determined to be representative of the phrase and may be more likely to provide desired search results.

The layout and/or content attributes, or more specifically, the content layout indicator(s), content type indicator(s), and/or application function indicator(s) may be used to determine application functionality to execute in connection with the detected text. For example, a predetermined association may exist between certain layout and/or content attributes and certain application functionality. Alternatively, application functionality that is determined to be a "best match" for a given set of layout and/or content attributes may be selected. For example, if the detected handwritten text is determined to include one or more content layout indicators indicating that the text represents a list, and it is further determined that a text line (e.g., a title of the list) includes the content type indicator "shopping," the selected application functionality may be functionality provided by an online shopping application. As another example, if the detected handwritten text is determined to include one or more content layout indicators indicating that the text represents a list, and it is further determined that a text line (e.g., a title of the list) includes the content type indicator "invite," the selected application functionality may be functionality provided by a calendaring application that may be executed to determine availability of potential invitees identified in additional text lines of the handwritten text, send invites, etc. As yet another example, if the detected handwritten text is determined to include an application function indicator, an application that provides the application function may be selected. For example, if the detected text includes a search function indicator, a search query may be generated based at least in part on at least a portion of the detected text associated with the search function indicator and the search query may be executed.

In certain example embodiments, the user device and/or the remote system may provide an Application Programming Interface (API) via which a third party application may specify one or more keywords and associated application functionality. Each such keyword may be associated with a set of application templates, where each application template specifies various categories of input data required to execute a corresponding application function. An application template may be represented using a tree structure in which the root node corresponds to a keyword that may be unique to a particular third-party application. The root node may then branch off into one or more child nodes, each of which may, in turn, branch off into one or more additional child nodes, and so on, until the tree structure terminates at a set of one or more leaf nodes. Each child node may correspond to a respective keyword. If a keyword specified by a third party application is detected in the handwritten text, then the corresponding application templates may be identified, and additional portions of the handwritten text may be analyzed to determine which application template can be populated with data based on the additional handwritten text. An application function associated with a fully populated template may then be executed. For example, the third-party application may be called or queried to execute the application function. In certain example embodiments, the unique keyword associated with the third-party application may be a name of the application. Further, in certain example embodiments, child nodes corresponding to application templates associated with different third-party applications may be associated with the same keyword since the root node may be associated with a keyword that is unique to a particular third-party application. For example, the keyword "play" may associated with child nodes in application templates associated with different third-party applications, and as such, may cause different execution results to occur depending on which application template is used (e.g., play music from a first different database associated with a first third-party application rather than music from a second database associated with music from a second third party application).

In certain example embodiments, an indication of an execution result associated with execution of the selected application functionality may be generated and presented on the writing surface in association with that portion of the handwritten text to which the execution result corresponds. The indication of the execution result may be rendered on the writing surface itself if the writing surface is an electronic display. On the other hand, if the writing surface is a non-electronic surface, the indication of the execution result may be an image that is projected onto the surface by the user device.

As an example, if the selected application functionality that is executed is provided by an online shopping application, the execution result may be identification of one or more products that correspond to a type of item indicated by a text line in the detected handwritten text. A product may be determined to correspond to a type of item if a product identifier of the product is linked to or otherwise stored in association with a tag representative of the type of item (e.g., a word or phrase in the handwritten text that identifies the type of item). The indication of the execution result that is presented on the writing surface may specify one or more attributes of the identified product (e.g., product brand, product name, product specifications, pricing information, etc.). In those example embodiments in which the writing surface is an electronic or non-electronic surface separate from a user device on which the application functionality is initiated, the product information may be displayed on a display of the user device. Further, in certain example embodiments, an identified product may be automatically added to an online shopping cart associated with a shopping application that provides the application functionality. For example, historical data associated with a user profile may be accessed. The historical data may indicate that an identified product was previously acquired as part of a prior product order associated with the user profile. In such example embodiments, the identified product may be automatically added to an online shopping cart. In addition, in certain example embodiments, an order for the identified product may be placed automatically.

In other example embodiments, if the selected application functionality that is executed is provided by a calendaring application, the execution result may be identification of the schedules or availability of a list of invitees identified in the detected handwritten text. The indication of the execution result may be a representation of a calendar that indicates the schedules or availability of the potential invitees. In still other example embodiments, if the selected application functionality that is executed is search functionality, the execution result may be a set of search results. The indication of the execution result that is presented on the writing surface may be an identification of the search results themselves or an indication that the search results are available for viewing on the user device. In yet other example embodiments, if the selected application functionality that is executed is application functionality that causes a particular task to be performed (e.g., scheduling of a doctor's appointment and creation of calendar appointment corresponding thereto), the indication of the execution result may indicate completion of the task and information relating thereto (e.g., the date/time of the appointment).

In certain example embodiments, an indication that application functionality is currently being executed or that execution of application functionality is completed may be presented on the writing surface. For example, if a content type indicator (e.g., underlining of a text line) is detected in the handwritten text indicating that the text represents a list, an indication that the list is being created may be presented on the writing surface. In certain example embodiments, this indication may be presented prior to the detection of additional text lines representing elements of the list. As another example, if an online order of a product is automatically placed or the product is otherwise acquired such as, for example, in a brick-and-mortar store, an indication that the product has been acquired may be presented in association with that portion of the detected handwritten text that corresponds to the acquired product. For example, a strikethrough line may be presented as an overlay over a text line in the handwritten text that identifies a type of item to which the acquired product corresponds.

It should be appreciated that the examples of writing surfaces, handwritten text, content and layout attributes (including content layout, content type, and/or application function indicators), application functionality, execution results, and indications of execution results and/or indications of application functionality executed provided above are merely illustrative and not exhaustive. It should be appreciated that numerous other examples/variations are within the scope of this disclosure.

Example embodiments of the disclosure provide a number of technical features, technical effects, and improvements to technology. For example, in accordance with example embodiments of the disclosure, handwritten text may be detected within an image of a writing surface that includes the text or by an electronic display on which the text is generated (or a separate user device communicatively coupled to the electronic display). The text may be processed to determine layout and/or content attributes of the text and application functionality corresponding to the determined layout and/or content attributes may be automatically identified and executed. One or more indicators indicating a status or result of executing the application functionality may be displayed on or projected onto the writing surface in association with the corresponding handwritten text. Thus, example embodiments of the disclosure provide a technical effect and a technological improvement to existing solutions that require a user to manually select an application to execute to perform a desired task. It should be appreciated that the above examples of technical features, technical effects, and/or improvements to technology of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Use Cases

FIG. 1 is a schematic diagram illustrating detection of handwritten text on a writing surface and execution of application functionality corresponding to the handwritten text in accordance with one or more example embodiments of the disclosure. FIG. 1 depicts a writing surface 102 and a writing instrument 110 that may be used to generate handwritten text 104 on the writing surface 102. In certain example embodiments, the writing surface 102 may be a physical, non-electronic surface such as, for example, a paper surface, an erasable whiteboard, or the like. In such example embodiments, the writing instrument 110 may be a standard writing instrument, such as a marker, a pencil, a pen, etc., that may be used to generate the handwritten text 104 on the writing surface 102.

A user device 114 that includes a display 116 may be provided. The user device 114 may include or may otherwise be operatively coupled to a camera 120 and an image projector 122. The user device 114 may be a smartphone device, a tablet device, a wearable computing device, or a device designed for non-mobile use that may enable voice-based and/or touch-based interactions with a user. The camera 120 may capture an image of the writing surface 102 having the handwritten text 104 thereon. The image may be a still image or an image frame of a video feed of the writing surface captured by the camera 120. The user device 114 may send signals to the image projector 122 to cause the image projector 122 to project images on the writing surface 102 that may include, for example, an indication of execution results of application functionality that is executed in connection with the handwritten text 104.

In other example embodiments, the writing surface 102 may be an electronic display configured to receive input data and display output data. For example, the electronic display 102 may include a resistive and/or a capacitive touch sensor configured to detect and interpret touch events at the display 102. The touch events may include, for example, contact between a user's hand and a display surface of the electronic display 102, contact between the writing instrument 110 and the display surface of the electronic display 102, or the like. In such example embodiments, the writing instrument 110 may be, for example, a stylus or other input device that may be used to provide input data to the electronic display 102 that is representative of the handwritten text 104. If the writing surface 102 is an electronic display, the display 102 may be communicatively coupled to the user device 114 via a direct wired connection or via one or more wired and/or wireless networks 112. The network(s) 112 may include any of the types of networks and transmission media described later in this disclosure in reference to network(s) 708 depicted in FIG. 7. Further, although not depicted in FIG. 1, in certain example embodiments, the writing surface 102 may form part of the user device 114. That is, the writing surface 102 may form part of the display 116 of the user device 114, in which case, a writing surface 102 separate from the user device 114 may not be provided.

As previously described, the handwritten text 104 may include one or more characters. Characters may include, for example, letters, numerical digits, punctuation marks, or the like. The handwritten text 104 may further include any symbol that conveys information regarding the text 104 such as a symbol that is associated with one or more characters in the text 104. For example, the handwritten text may include a graphical indicator associated with another portion of the handwritten text such as underlining of text; a bullet point, dash, or the like used to delineate a particular text line; a shape (e.g., a rectangle, circle, etc.) that encompasses one or more characters of the text; and so forth. In certain example embodiments, such graphical indicators may be content layout indicators that indicate a layout (e.g., a formatting or organization) of the handwritten text 104. For example, underlining of a text line in the handwritten text 104 (e.g., content layout indicator 108A) and/or a bullet point in the handwritten text 104 (e.g., content layout indicator 108B) may indicate that the handwritten text 104 is formatted as a list of content elements.

In other example embodiments, a graphical indicator (e.g., a shape such as a circle) that encompasses at least a portion of the text 104 may be used to delineate a grouping of related content. For example, at least a portion of the text 104 contained within a shape on the writing surface 102 may be determined to include a group of items that a user desires to purchase, a group of tasks to be performed, etc. As described in more detail below, a combination of OCR processing and natural language processing may be executed to identify the shape on the writing surface 102 and determine content attributes of text contained within the shape. In certain example embodiments, a graphical indicator (e.g., a shape) that encompasses at least a portion of the text 104 may be identified as a content layout indicator that delineates a grouping as a result of being a predefined shape, a user-selected shape among predetermined options, or a shape that is determined through machine-learning techniques.

In those example embodiments in which an image of the writing surface 102 is captured by the camera 120, the user device 114 may perform OCR processing or the like on the image to detect the handwritten text 104 in the image. The user device 114 may further execute natural language processing on the handwritten text 104 in the image to determine one or more layout and/or content attributes of the text 104. Alternatively, in certain example embodiments, the user device 114 may send the OCR results to a remote system including one or more servers (e.g., back-end server(s) 702 depicted in FIG. 7) which may, in turn, execute the natural language processing on the text 104. In still other alternative example embodiments, the user device 114 may send the image to the remote system, and the remote system may both execute the OCR processing on the image to detect the handwritten text 104 and execute the natural language processing on the detected text 104. In yet other example embodiments, the user device 114 and the remote system may together perform the OCR processing and/or the natural language processing in a distributed manner.

The layout attribute(s) determined as a result of execution of the natural language processing on the text 104 may include, for example, one or more content layout indicators present in the handwritten text 104 that indicate a format or organization of the text 104 on the writing surface 102. For example, the content layout indicators 108A and 108B may be identified. The content layout indicator 108A may be underlining of a text line in the handwritten text 104 and the content layout indicator 108B may be a bullet point in the handwritten text 104. Each of the content layout indicators 108A, 108B alone or taken together may indicate that the handwritten text 104 is formatted as a list of content elements.

For example, in certain example embodiments, the content layout indicator 108A may indicate that the text line with which it is associated (e.g., the text line that is under-lined) represents a title of a list of content elements represented by additional text lines that appear below the text line. In certain example embodiments, the content layout indicator 108A may indicate that the text 104 is representative of a list of content elements even before the additional text lines are applied to the writing surface 102 and/or detected on the writing surface 102. In such example embodiments, a data structure representative of the list may be generated and then populated with the content elements of the list as they are detected in the text 104. Further, in certain example embodiments, the content layout indicator 108B may indicate that the text 104 is representative of a listing of content elements even in the absence of the content layout indicator 108A or the text line with which the content layout indicator 108A is associated. For example, a series of text lines, each of which is associated with the content layout indicator 108B (or another graphical indicator), may indicate that the text 104 is formatted as a listing of content elements.

The content attribute(s) determined as a result of the natural language processing performed on the text 104 may include one or more content type indicators and/or one or more application function indicators. A content type indicator may be, for example, a particular keyword or a set of keywords present in the detected handwritten text. For example, the handwritten text 104 may include a text line that includes the content type indicator 106 "shopping." Such a content type indicator may indicate—potentially along with one or more of the content layout indicators 108A, 108B—that the handwritten text 104 (e.g., additional lines of text below the text line that includes the content type indicator 106) represents a listing of types of items to be acquired (e.g., a shopping list).

In certain example embodiments, the content type indicator 106 may not be present in a text line of the handwritten text 104, but a content attribute of the detected text 104 may nonetheless be determined. For example, semantic language processing may be executed on the handwritten text 104 to determine common attribute(s) of different portions of the text 104. For example, semantic language processing may indicate that multiple portions of the text 104 (e.g., text lines) each correspond to different types of items available for acquisition (e.g., a shopping list), different tasks to be performed (e.g., a to-do list), and so forth.

The layout and/or content attributes, or more specifically, the content layout indicator(s) (e.g., content layout indicators 108A, 108B), content type indicator(s) (e.g., content type indicator 106), and/or application function indicator(s) determined as a result of the natural language processing performed on the text 104 may be used to determine application functionality to execute in connection with the detected text 104. For example, in the example use case depicted in FIG. 1, the content layout indicator 108A and/or the content layout indicator 108B may be used to determine that the text 104 represents a list, and the content type indicator 106 may be used to determine application functionality to execute with respect to elements of the list. If the list represented by the text 104 is a listing of items to acquire, the selected application functionality may be, for example, functionality provided by an online shopping application 118. As another example, if the detected handwritten text 104 is determined to include one or more content layout indicators indicating that the text represents a list, and it is further determined that a text line (e.g., a title of the list) includes the content type indicator "invite," the selected application functionality may be functionality provided by a calendaring application that may be executed to determine availability of potential invitees identified in additional text lines of the handwritten text 104, send invites, etc.

Execution of the selected application functionality may generate one or more execution results. For example, execution of functionality provided by the online shopping application 118 may result in the identification of one or more products that correspond to a type of item indicated by a text line in the detected handwritten text 104. In certain example embodiments, an identified product may be automatically added to an online shopping cart associated with the shopping application 118. For example, as depicted in FIG. 1, specific products corresponding to the types of items identified by lines of text in the handwritten text 104 are shown as being automatically added to a shopping cart of the shopping application 118. In addition, in certain example embodiments, an order for an identified product may be placed automatically.

Figure 2:
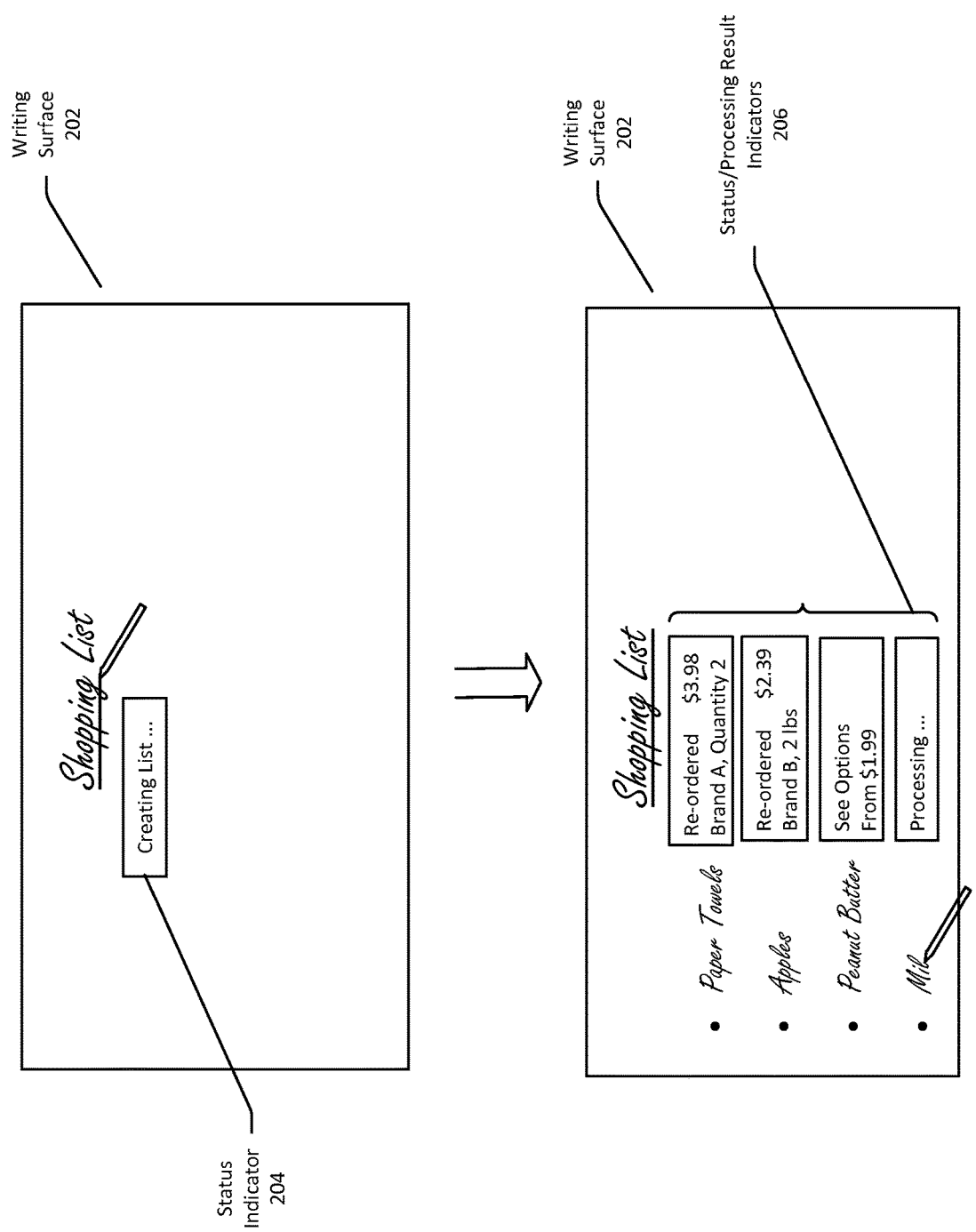
FIG. 2 is a schematic diagram illustrating detection of handwritten text on a writing surface, determination of a type of content included in the handwritten text, determination of application functionality corresponding to the type of content, and presentation, on the writing surface, of the status and/or processing results of execution of the application functionality in accordance with one or more example embodiments of the disclosure.

FIG. 2 is a schematic diagram illustrating detection of handwritten text on a writing surface, determination of a type of content included in the handwritten text, determination of application functionality corresponding to the type of content, and presentation, on the writing surface, of the status and/or processing results of execution of the application functionality in accordance with one or more example embodiments of the disclosure.

A writing surface 202 is depicted in FIG. 2. The writing surface 202 may be the writing surface 102 depicted in FIG. 1. In certain example embodiments, an indication of an execution result of execution of application functionality and/or an indication that application functionality is currently being executed may be presented on the writing surface 202. Such indications may be rendered on the writing surface 202 directly if the writing surface 202 is an electronic display (either the display 116 of the user device 114 or a separate display communicatively coupled to the user device 114) or may be projected onto the writing surface 202 by the image projector 122 if the writing surface 202 is a non-electronic display.

For example, if a content layout indicator (e.g., the content layout indicator 108A) is detected in the handwritten text 104 indicating that the text 104 represents a list, a status indicator 204 indicating that the list is being created may be presented on the writing surface 202. In certain example embodiments, the status indicator 204 may be presented prior to the detection and/or creation of additional text lines representing elements of the list. Further, in certain example embodiments, the status indicator 204 may be presented on the writing surface 202 in association with that portion of the handwritten text 104 to which the application functionality being executed corresponds. For example, as shown in FIG. 2, the status indicator 204 "creating list" is depicted as being presented on the writing surface 202 in proximity to the text line that represents a title of the list and that is associated with the content layout indicator 108A. As previously noted, the status indicator 204 may be rendered on the writing surface 202 itself if the writing surface 202 is an electronic display or may be projected as an image overlay on the writing surface 202 if the writing surface is a non-electronic surface.

As previously described, execution of the selected application functionality may generate one or more execution results. For example, if the application 118 is an online shopping application, an execution result may be identification of one or more products that correspond to a type of item indicated by a text line in the detected handwritten text 104. A product may be determined to correspond to a type of item if a product identifier of the product is linked to or otherwise stored in association with metadata (e.g., a tag) representative of the type of item (e.g., a word or phrase in the handwritten text 104 that identifies the type of item).

Further, in certain example embodiments, an execution result may include automatically adding an identified product to an online shopping cart associated with the shopping application 118. For example, historical data associated with a user profile may be accessed. The historical data may indicate that an identified product was previously acquired as part of a prior product order associated with the user profile. In such example embodiments, the identified product may be automatically added to an online shopping cart. In addition, in certain example embodiments, an execution result may be automatically placing an order for the identified product. If an order for the product is placed, a shipping address associated with the prior product order may be determined and automatically associated with the current product order.

In certain example embodiments, various status indicators or processing result indicators 206 may be presented on the writing surface 202. For example, a processing result indicator 206 indicative of an execution result that includes identification of one or more products corresponding to a type of item in a list represented by the detected handwritten text 104 may be presented on the writing surface 202. Such a processing result indicator 206 may specify one or more attributes of an identified product (e.g., product brand, product name, product specifications, pricing information, etc.). Alternatively, such a processing result indicator 206 may indicate that one or more products have been identified. Additional product information relating to the identified product(s) may then be rendered on the writing surface 202 in response to a user selection of the processing result indicator 206 if the writing surface 202 is an electronic display or may be accessed via the display 116 of the user device 114 if the writing surface 202 is a non-electronic surface. As another example, a processing result indicator 206 may indicate that a product that was automatically ordered or added to a shopping cart. In addition, a status indicator 206 may be presented indicating that a portion of the handwritten text 104 is being processed (e.g., detected) as the portion of text is being generated on the writing surface 202.

In certain example embodiments, information presented on the writing surface 202 (e.g., status indicators, processing result indicators, other content, etc.) may be retrieved by the user device 114 from a third-party network resource. For example, a remote server may send a uniform resource locator (URL) or other network resource identifier to the user device 114. The user device 114 may use the URL to access content from a third party network resource. The user device 114 may then format the content in accordance with a local device template and present the content on the writing surface 202.

In certain example embodiments, multiple products of different brands or a same branded product available in different size containers or quantities (e.g., family size or individual size) may correspond to a particular type of item. Each such product may be associated with a unique product identifier. In such example embodiments, historical data associated with a user profile may be accessed to determine a particular product identifier that is associated with a prior product order for the user profile from among multiple product identifiers associated with the same type of item. A processing result indicator 206 that includes an image of the specific product associated with the particular product identifier and/or other identifying information of the specific product may then be presented on the writing surface 202. Further, the particular product identifier associated with the prior product order may serve to disambiguate which specific product among multiple products associated with the same type of item should be added to an online shopping cart or automatically ordered during a current application session.

In certain example embodiments, the user profile may be determined based on the handwritten text 104. For example, the handwritten text 104 may be analyzed to determine various characteristics of the text 104 such as, for example, maximum/minimum letter sizes, sizes of particular types of letters, shapes of particular letters, spacing between letters, and so forth. These characteristics may be evaluated against stored data indicative of characteristics associated with previous handwritten text known to be associated with particular user profiles. If a match is detected between the characteristics of the handwritten text 104 and stored characteristics of handwritten text associated with a particular user profile (perhaps within a threshold tolerance), the handwritten text 104 may be determined to be associated with the particular user profile.

In addition, a user account may be associated with multiple user profiles. For example, a user account may be shared by multiple members of a household, where each household member has a corresponding user profile associated with the user account. Various account-level information may be associated with the user account such as, for example, payment information (e.g., stored credit card information), shipping information (e.g., a home address), and other information that may be applicable to all user profiles associated with the user account. Other types of information may be user profile-specific such as, for example, purchase history, recommendations, media/content preferences, age, gender, etc.

Figure 3:
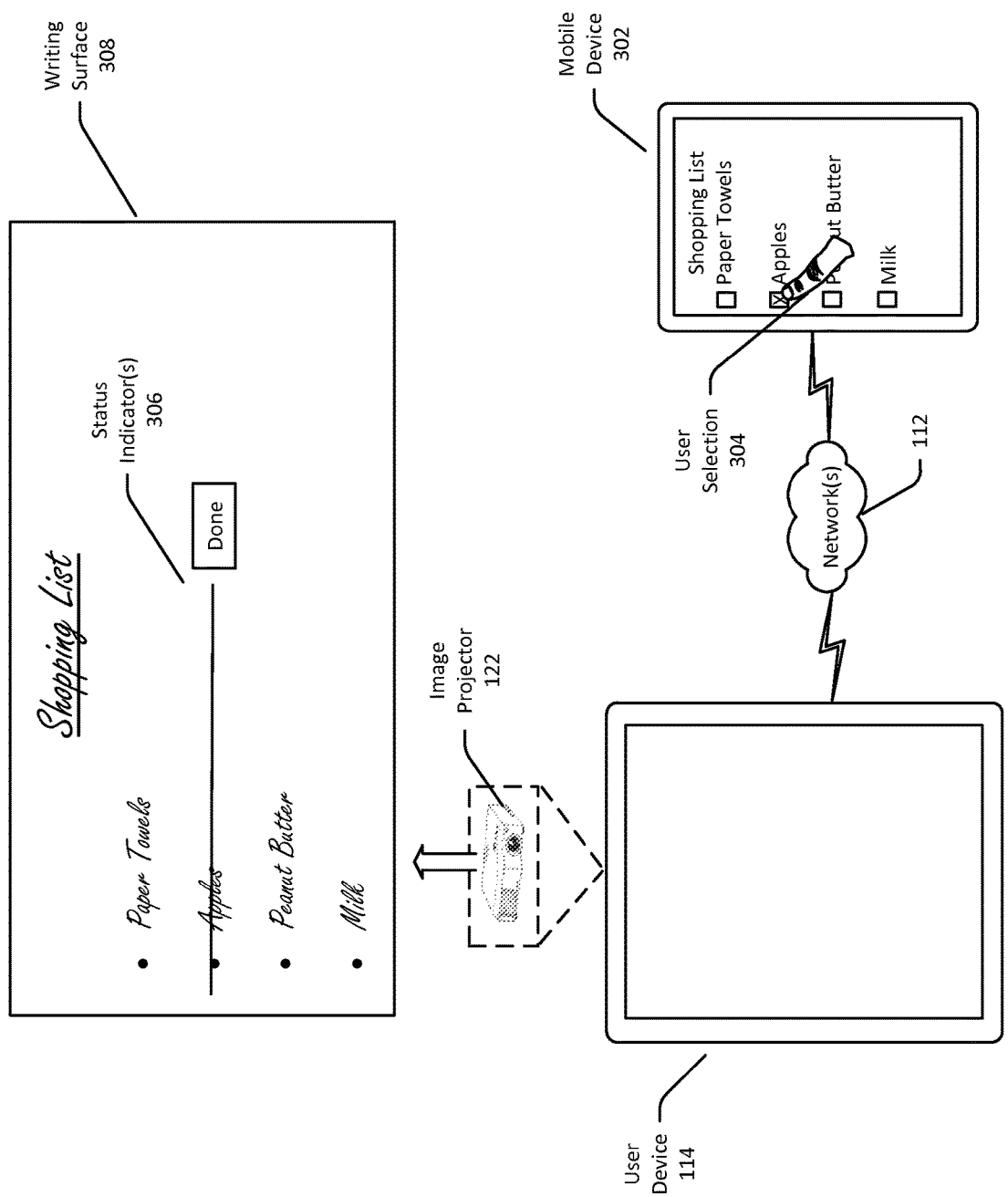
FIG. 3 is a schematic diagram illustrating receipt, from a mobile device, of an indication of acquisition of a product corresponding to a particular type of item and presentation of an indicator that indicates acquisition of the product on a writing surface that includes handwritten text representative of a listing of types of items in accordance with one or more example embodiments of the disclosure.

FIG. 3 is a schematic diagram illustrating receipt, from a mobile device, of an indication of acquisition of a product corresponding to a particular type of item and presentation of an indicator that indicates acquisition of the product on a writing surface that includes handwritten text representative of a listing of types of items in accordance with one or more example embodiments of the disclosure.

A writing surface 308 is depicted in FIG. 3. The writing surface 308 may be the writing surface 102 depicted in FIG. 1. In certain example embodiments, the detected handwritten text 104 may be accessed via a mobile application executing on a mobile device 302. For example, if the handwritten text 104 is determined to be representative of a list of types of items, data indicative of item types in the list may be sent to the mobile device 302, potentially via the user device 114, and the list may be reproduced by a mobile application executing on the mobile device 302.

A user of the mobile device 302 may access the mobile application while the user is at a brick-and-mortar store, for example. The user may access the mobile application to determine the types of items in the list. If a user acquires a product at the brick-and-mortar store that corresponds to an item type in the list, the user may make a user selection 304 indicating acquisition of the product. The mobile device 302 may then send an indication of the user selection 304 to, for example, the user device 114 via one or more of the network(s) 112. The user device 114 may, in turn, generate one or more data signals and send the data signal(s) to the image projector 122 to cause the image projector 122 to generate an image based at least in part on the data signal(s) and project the image on the writing surface 308. The image may include one or more status indicators 306 that may be graphical indicators that a product corresponding to a particular element of the list (e.g., a particular item type in the list) has been acquired. For example, the status indicator(s) 306 may include a graphical indicator that appears as a strikethrough of a text line that identifies the item type for which a corresponding product has been acquired, a text indicator indicating acquisition of the product, or the like. In other example embodiments, the status indicator(s) may be rendered directly on the writing surface 308 if the writing surface 308 is an electronic display.

In certain example embodiments, the list rendered on the mobile device may be dynamically updated as additional text lines representing additional item types in the list are detected and/or created. Further, while FIG. 4 has been described in the context of a product purchase at a brick-and-mortar store, it should be appreciated that the example embodiment described above may also apply to an online product purchase using the mobile device 302.

Figure 4:
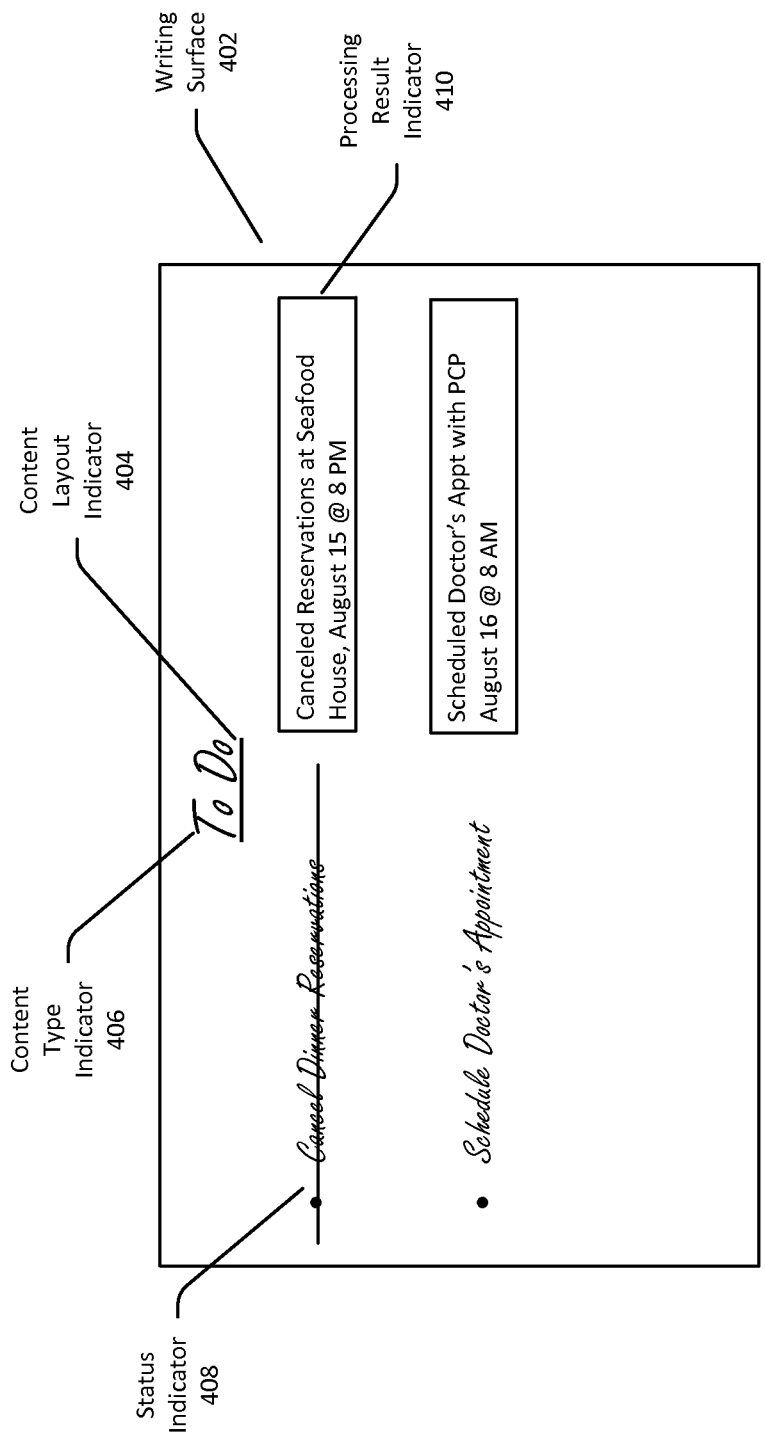
FIG. 4 is a schematic diagram illustrating a writing surface that includes handwritten text representative of a listing of tasks to be performed and the presentation of indicators indicating the results of executing application functionality corresponding to the tasks in accordance with one or more example embodiments of the disclosure.

FIG. 4 is a schematic diagram illustrating a writing surface that includes handwritten text representative of a listing of tasks to be performed and the presentation of indicators indicating the results of executing application functionality corresponding to the tasks in accordance with one or more example embodiments of the disclosure.

A writing surface 402 is depicted in FIG. 4. The writing surface 402 may be the writing surface 102 depicted in FIG. 1. In certain example embodiments, natural language processing of the detected handwritten text 104 may indicate that the text 104 is representative of a listing of tasks to be performed. For example, a content layout indicator 404 may indicate that the text represents a listing of content elements, and a content type indicator 406 (e.g., one or more keywords) may indicate that each content element represents a task to be performed.

In certain example embodiments, each text line in the text 104 that corresponds to a particular task to be performed may be processed to determine one or more keywords present in the text line that indicate application functionality to access and execute to perform the corresponding task. For example, if a text line includes the phrase "Cancel Dinner Reservations," it may be determined that the text line includes the keywords "cancel" and "dinner," and a calendaring application may be launched on the user device 114 to determine a date/time of an appointment that corresponds to the dinner reservation to be canceled. If multiple candidate reservations are identified, the user may be prompted to provide more information to enable identification of the appropriate reservation (e.g., the user may be prompted to select the appropriate reservation from a list of candidate reservations).

Upon identifying the appropriate reservation, the user device 114 may determine an application via which the reservation was made and may launch that application to cancel the reservation. Alternatively, if no such application can be determined, the user device 114 may generate and send a notification (e.g., a Short Message Service (SMS) message) to an appropriate recipient. Upon execution of the selected application functionality, a status indicator 408 (e.g., a strikethrough of a text line representing the task that was performed) may be presented on the writing surface 402 to indicate completion of the task. In addition, a processing result indicator 410 may be presented on the writing surface 402 that indicates information relating to the completed task (e.g., information identifying the specific reservation that was canceled, information identifying an appointment that was scheduled, etc.). It should be appreciated that the above example is merely illustrative, and that any suitable task may be identified in the text 104 and any corresponding application functionality may be selected for execution to complete the task.

Figure 5:
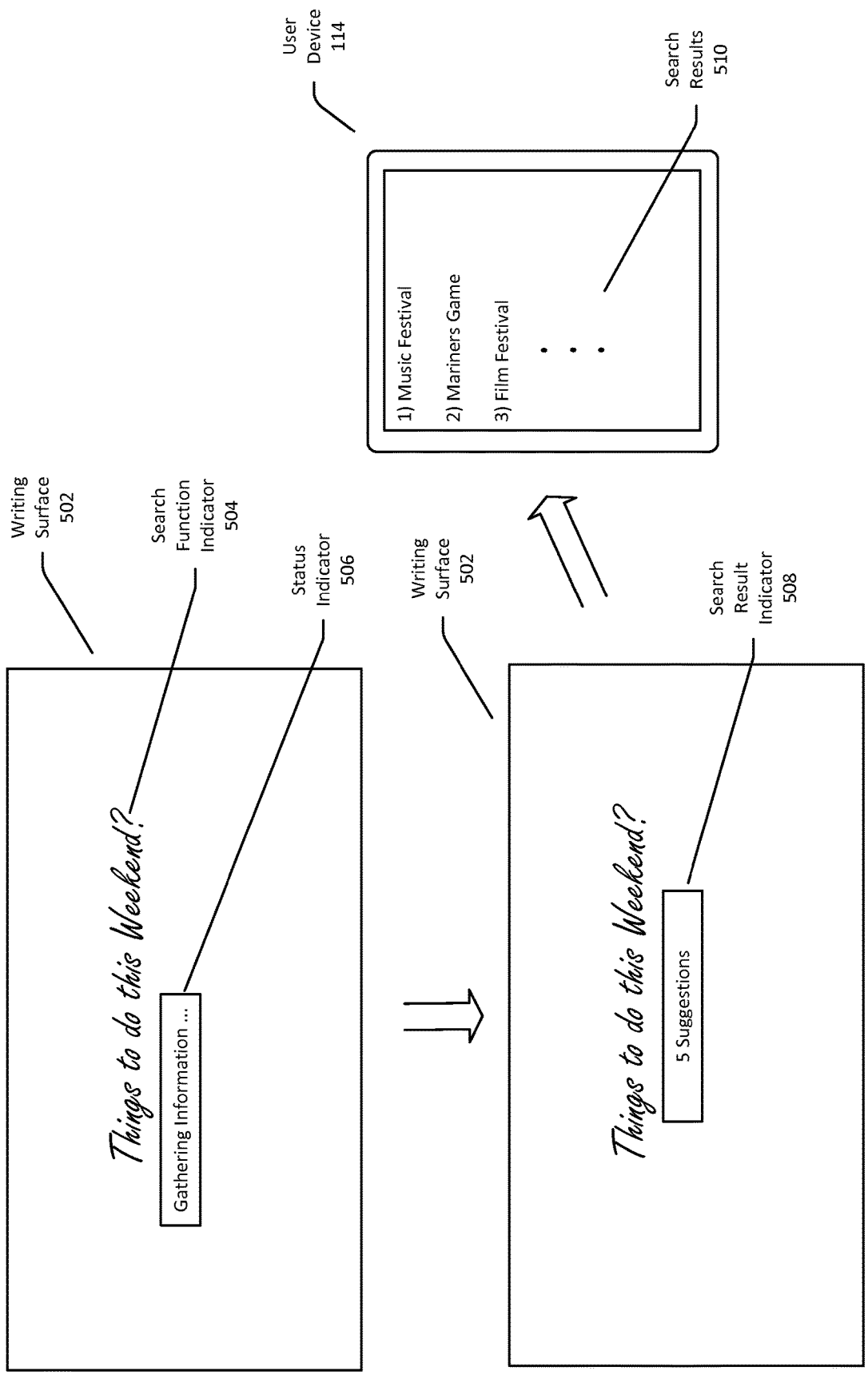
FIG. 5 is a schematic diagram illustrating detection of handwritten text on a writing surface, determination of a search function indicator included in the handwritten text, determination of a search query using at least a portion of the handwritten text, and presentation, on the writing surface, of an indication of search results obtained as a result of execution of the search query in accordance with one or more example embodiments of the disclosure.

FIG. 5 is a schematic diagram illustrating detection of handwritten text on a writing surface, determination of a search function indicator included in the handwritten text, determination of a search query using at least a portion of the handwritten text, and presentation, on the writing surface, of an indication of search results obtained as a result of execution of the search query in accordance with one or more example embodiments of the disclosure.

A writing surface 502 is depicted in FIG. 5. The writing surface 502 may be the writing surface 102 depicted in FIG. 1. As previously described, a content type indicator determined using natural language processing of the text 104 may be an application function indicator. An application function indicator may be, for example, a graphical indicator present in the detected text 104 that indicates a particular application function to be performed with respect to at least a portion of the detected text 104. An example application function indicator (e.g., search function indicator 504) may be a particular character (e.g., "?") that indicates that a search function is to be performed.

A search query may be generated based on the presence of the search function indicator 504 in the detected text 104. In certain example embodiments, the search query may include a word or phrase that is not in the portion of the detected text 104 that is associated with the search function indicator 504, but that is representative of the portion of the detected text 104 and that is chosen to optimize the search results obtained. For example, as illustratively shown in FIG. 5, the portion of the detected text 104 associated with the search function indicator 504 may include the phrase "Things to do this Weekend?" In this example, the search query that is generated may include a word or phrase other than what appears in the portion of the detected text 104 associated with the search function indicator 504. For example, the search query may include the word "event" because this word may be determined to be representative of the words/phrase in the portion of the detected text 104 and may be more likely to provide desired search results. Alternatively, the search query may include one or more words from the portion of the detected text 104. For example, if the portion of the detected text 104 includes the phrase "Concerts this weekend?," a search query that includes the word "concerts" may be generated.

In certain example embodiments, other information may be used to target the search. For example, an example search query generated in connection with the illustrative use case depicted in FIG. 5 may be limited to a particular geographic area over a date range indicated by the phrase "this weekend." The relevant geographic area may be determined from address information associated with a user profile, from GPS coordinates of the user device 114, or the like.

The generated search query may then be executed. As the search query is being executed, a status indicator 506 may be presented on the writing surface 502. The status indicator 506 may indicate that the search query is currently being executed. The execution result of execution of the search query may be a set of search results. Accordingly, the indication of the execution result that is presented on the writing surface 502 may be an identification of the search results themselves or a search result indicator 508 that may identify the number of results obtained and that the search results 510 are available for viewing on the user device 114. If the writing surface 502 is an electronic display, the search results 510 may be rendered directly on the writing surface 502 and may be manipulatable via user interaction with the writing surface 502.

In certain example embodiments, the search results 510 and/or other content rendered on or projected onto the writing surface 502 may be targeted to a particular user profile. For example, historical purchase data, search/browsing history, etc. associated with a user profile may be accessed and analyzed to provide recommendations targeted to the user profile or otherwise identify content that may be of interest to a user associated with the user profile. For example, the search results 510 obtained as a result of execution of search query may be filtered based on historical user profile data. As another example, historical user profile data (e.g., product purchase history) may be used to recommend specific products, rank the search results 510 based on their likelihood of being of interest to a user associated with the user profile, and so forth.

Illustrative Processes

Figure 6:
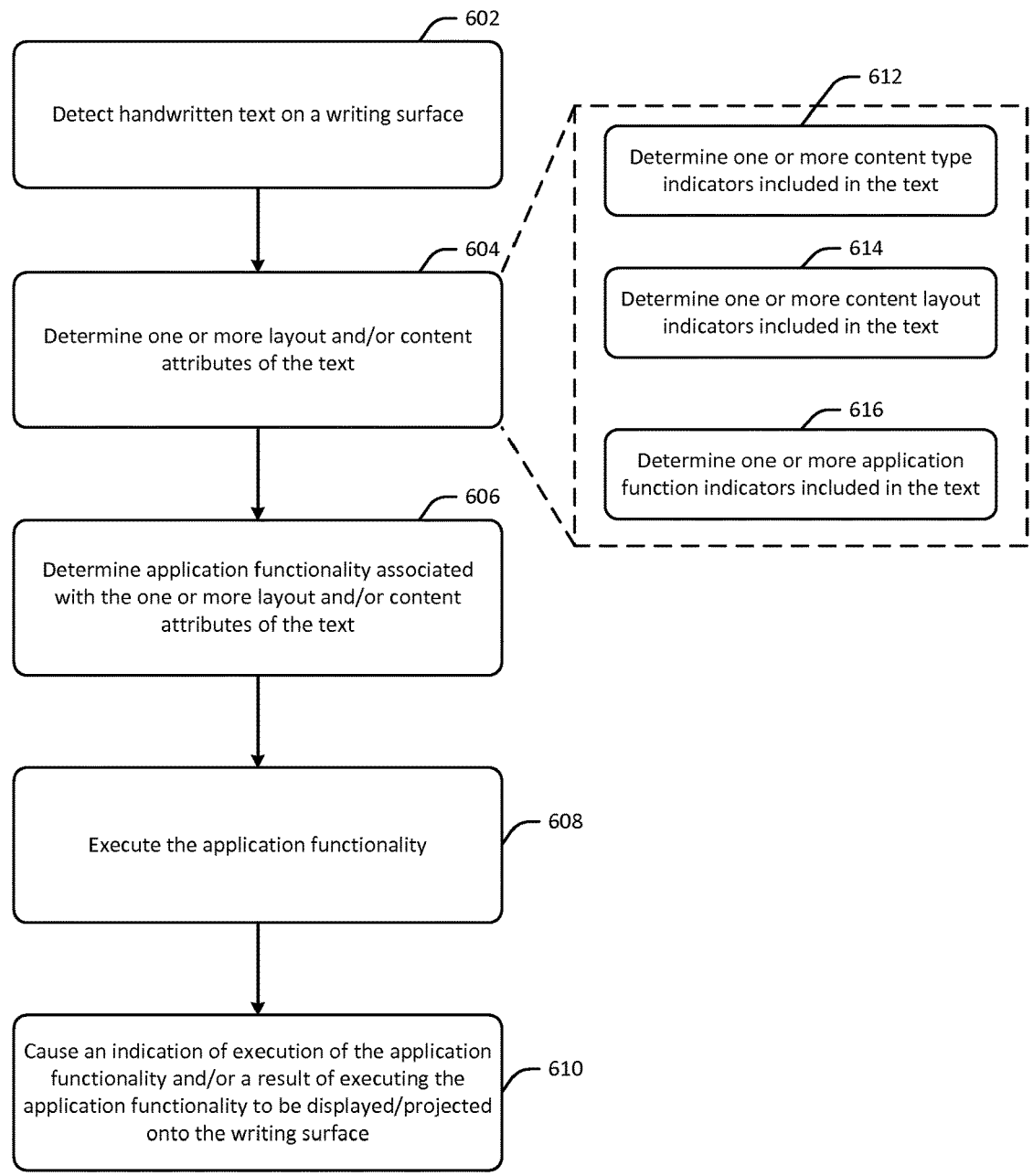
FIG. 6 is a process flow diagram of an illustrative method for detecting handwritten text on a writing surface, determining one or more layout and/or content attributes of the handwritten text, determining application functionality associated with the layout and/or content attribute(s), executing the application functionality, and causing one or more indications associated with execution of the application functionality to be presented on the writing surface in accordance with one or more example embodiments of the disclosure.

FIG. 6 is a process flow diagram of an illustrative method 600 for detecting handwritten text on a writing surface, determining one or more layout and/or content attributes of the handwritten text, determining application functionality associated with the layout and/or content attribute(s), executing the application functionality, and causing one or more indications associated with execution of the application functionality to be presented on the writing surface in accordance with one or more example embodiments of the disclosure. One or more operations of the method 600 may be described as being performed by one or more modules containing any combination of software, hardware, and/or firmware. It should be appreciated, however, that such description may be a shorthand reference for performance of the operation(s) in response to execution of computer-executable of the module(s). Further, any operation of the method 600 may be performed by one or more program modules executing on one or more remote servers (e.g., back-end server(s) 702 depicted in FIG. 7) and/or one or more program modules executing on a user device (e.g., a user device 704 which may correspond to the user device 114). Moreover, processing corresponding to any operation of the method 600 may potentially be performed in a distributed manner (and potentially in parallel) between a back-end server 702 and a user device 704.

At block 602, one or more text analysis module(s) may detect handwritten text on a writing surface. Any of the mechanisms previously described may be employed to detect the handwritten text. For example, a camera of a user device 704 may capture an image of the writing surface and the text analysis module(s) may perform OCR processing on the image to identify the handwritten text. In other example embodiments, the text may be generated on an electronic display in response to user input received at the display.

At block 604, the text analysis module(s) may determine one or more layout and/or content attributes of the handwritten text. In particular, the text analysis module(s) may perform natural language processing on the text to determine the layout and/or content attributes. In certain example embodiments, the operation at block 604 may include one or more of the operations at blocks 612-616. For example, as previously described, the text analysis module(s) may determine, at block 612, one or more content type indicators included in the handwritten text. A content type indicator may be, for example, a keyword present in a line of text. At block 614, the text analysis module(s) may determine one or more content layout indicators included in the handwritten text. A content layout indicator may be a graphical indicator that indicates a particular format/layout/organization of the text. For example, a content layout indicator may be underlining of text, a bullet point, etc. that indicates that the text represents a listing of content elements. At block 616, the text analysis module(s) may determine one or more application function indicators included in the handwritten text. An application function indicator may be a graphical indicator, a character, or the like in the text that identifies a particular application function to be performed in connection with a portion of the text associated with the application function indicator. An example application function indicator is the search function indicator described earlier.

At block 606, one or more application functionality correlation module(s) may determine application functionality associated with the layout and/or content attribute(s) of the text. More specifically, the application functionality correlation module(s) may determine a correspondence between application functionality and one or more content layout, content type, and/or application function indicators determined to be present in the text. At block 608, the application functionality determined at block 606 may be executed. In particular, one or more application modules that provide the application functionality determined at block 606 may be executed.

At block 610, one or more application execution status modules may be executed to cause an indication of execution of the application functionality and/or an indication of an execution result of executing the application functionality to be presented on the writing surfaced. As previously described, the indication(s) may be rendered on the writing surface itself if the writing surface is an electronic display or projected by an image projector of the user device 704 onto a non-electronic writing surface.

Illustrative Networked Architecture

Figure 7:
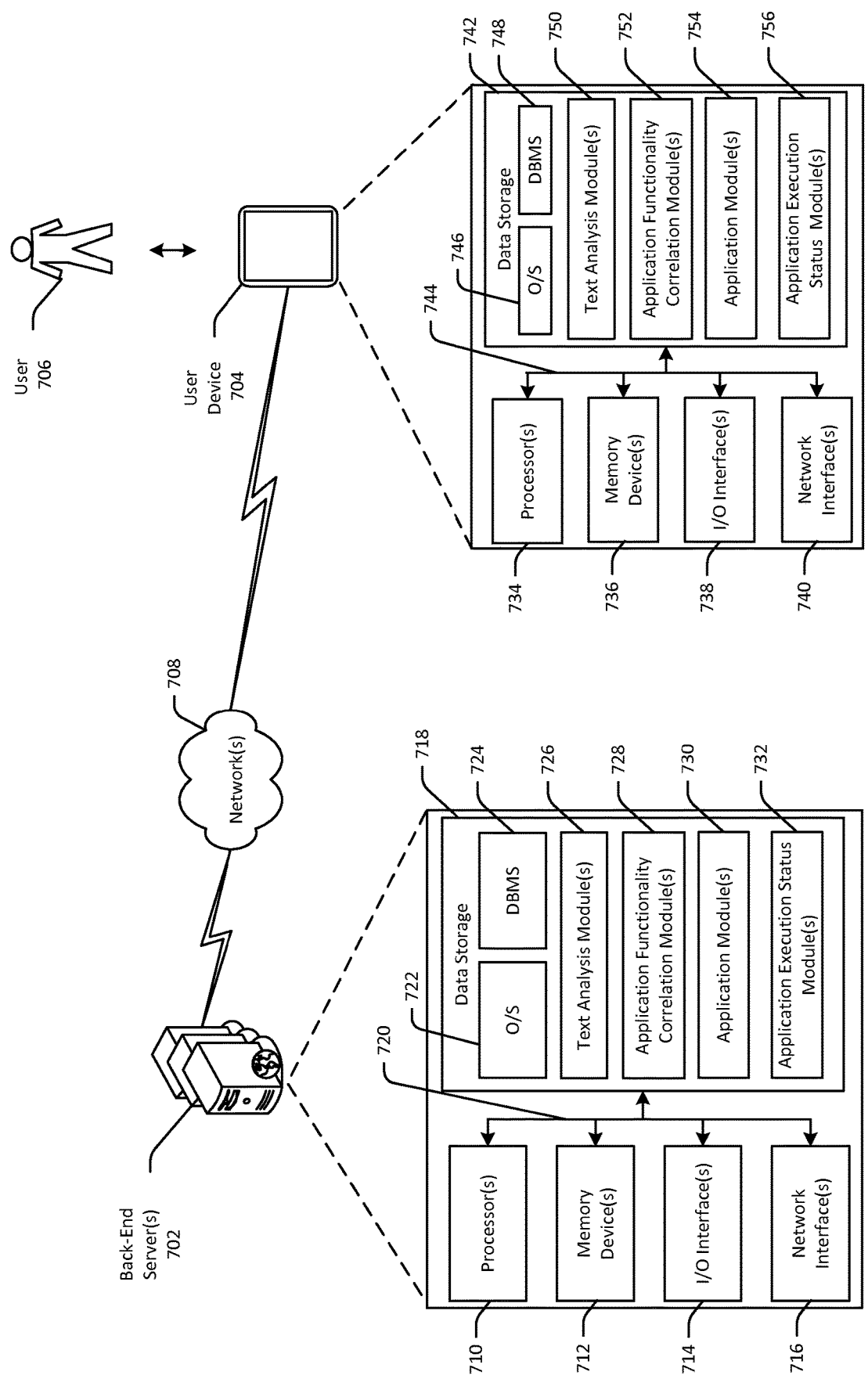
FIG. 7 is a schematic diagram of an illustrative networked architecture in accordance with one or more example embodiments of the disclosure.

FIG. 7 is a schematic diagram of an illustrative networked architecture 700 in accordance with one or more example embodiments of the disclosure. The networked architecture 700 may include one or more back-end servers 702 and a user device 704. A user 706 may interact with the user device 704. For example, a user 706 may utilize a user device 704 to access and/or view the results of execution of application functionality. The user device 704 may, in various example embodiments, correspond to the user device 114 depicted in earlier figures. While the back-end server(s) 702 and/or the user device 704 may be referred to herein in the singular, it should be appreciated that multiple ones of any of the illustrative components of the networked architecture 700 may be provided, and any processing described as being performed by a particular component of the architecture 700 may be performed in a distributed manner by multiple such components.

The back-end server 702 and the user device 704 may be configured to communicate via one or more networks 708. In addition, a first user device 704 may be configured to communicate with a second user device 704 via the network(s) 708 (and potentially via the back-end server 702). The network(s) 708 may include any of the network(s) 112. The network(s) 708 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 708 may have any suitable communication range associated therewith and may include, for example, global networks (e.g., the Internet), metropolitan area networks (MANs), wide area networks (WANs), local area networks (LANs), or personal area networks (PANs). In addition, the network(s) 708 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the back-end server 702 may include one or more processors (processor(s)) 710, one or more memory devices 712 (generically referred to herein as memory 712), one or more input/output ("I/O") interface(s) 714, one or more network interfaces 716, and data storage 718. The back-end server 702 may further include one or more buses 720 that functionally couple various components of the server 702. These various components of the server 702 will be described in more detail hereinafter.

The bus(es) 720 may include at least one of a system bus, a memory bus, an address bus, or a message bus, and may permit exchange of information (e.g., data (including computer-executable code), signaling, etc.) between various components of the server 702. The bus(es) 720 may include, without limitation, a memory bus or a memory controller, a peripheral bus, an accelerated graphics port, and so forth. The bus(es) 720 may be associated with any suitable bus architecture including, without limitation, an Industry Standard Architecture (ISA), a Micro Type Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 712 of the server 702 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 712 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 712 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 718 may include removable storage and/or non-removable storage including, but not limited to, magnetic storage, optical disk storage, and/or tape storage. The data storage 718 may provide non-volatile storage of computer-executable instructions and other data. The memory 712 and the data storage 718, removable and/or non-removable, are examples of computer-readable storage media (CRSM) as that term is used herein.

The data storage 718 may store computer-executable code, instructions, or the like that may be loadable into the memory 712 and executable by the processor(s) 710 to cause the processor(s) 710 to perform or initiate various operations. The data storage 718 may additionally store data that may be copied to memory 712 for use by the processor(s) 710 during the execution of the computer-executable instructions. Moreover, output data generated as a result of execution of the computer-executable instructions by the processor(s) 710 may be stored initially in memory 712, and may ultimately be copied to data storage 718 for non-volatile storage.

More specifically, the data storage 718 may store one or more operating systems (O/S) 722; one or more database management systems (DBMS) 724; and one or more program modules, applications, or the like such as, for example, one or more text analysis modules 726, one or more application functionality correlation modules 728, one or more application modules 730, and one or more application execution status modules 732. Any of the program modules may include one or more sub-modules. Any of the modules depicted in FIG. 7 may include computer-executable code, instructions, or the like that may be loaded into the memory 712 for execution by one or more of the processor(s) 710. Each module depicted as part of the server 702 may enable similar functionality as described earlier in connection with similarly named modules. In addition, any data stored in one or more external datastores (not shown) may be accessed via the DBMS 724, stored in the data storage 718, and loaded in the memory 712 for use by the processor(s) 710 in executing computer-executable code of any of the program modules.

Such external datastore(s) may include, without limitation, databases (e.g., relational, object-oriented, etc.), file systems, flat files, distributed datastores in which data is stored on more than one node of a computer network, peer-to-peer network datastores, or the like. Such datastore(s) may store various types of data such as, for example, user profile data, OCR result data, natural language processing data, and so forth. The user profile data may include prior session data for one or more user profiles. The prior session data for a user profile may include historical purchase data indicating items purchased during previous application sessions. Any data stored in such datastore(s) may be generated by the back-end server 702 and/or the user device 704. Further, any data stored in such datastore(s) may be generated by one component of the networked architecture 700, stored in the datastore(s), and retrieved from the datastore(s) by another component of the networked architecture 700.

The processor(s) 710 may be configured to access the memory 712 and execute computer-executable instructions loaded therein. For example, the processor(s) 710 may be configured to execute computer-executable instructions of the various program modules of the server 702 to cause or facilitate various operations to be performed in accordance with one or more embodiments of the disclosure. The processor(s) 710 may include any suitable processing unit capable of accepting data as input, processing the input data in accordance with stored computer-executable instructions, and generating output data. The processor(s) 710 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 710 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 710 may be capable of supporting any of a variety of instruction sets.

Referring now to other illustrative components depicted as being stored in the data storage 718, the O/S 722 may be loaded from the data storage 718 into the memory 712 and may provide an interface between other application software executing on the server 702 and hardware resources of the server 702. More specifically, the O/S 722 may include a set of computer-executable instructions for managing hardware resources of the server 702 and for providing common services to other application programs (e.g., managing memory allocation among various application programs). The O/S 722 may include any operating system now known or which may be developed in the future including, but not limited to, any server operating system, any mainframe operating system, or any other proprietary or non-proprietary operating system.

The DBMS 724 may be loaded into the memory 712 and may support functionality for accessing, retrieving, storing, and/or manipulating data stored in the memory 712 and/or data stored in the data storage 718. The DBMS 724 may use any of a variety of database models (e.g., relational model, object model, etc.) and may support any of a variety of query languages. The DBMS 724 may access data represented in one or more data schemas and stored in any suitable data repository.

Referring now to other illustrative components of the server 702, one or more input/output (I/O) interfaces 714 may be provided that may facilitate the receipt of input information by the server 702 from one or more I/O devices as well as the output of information from the server 702 to the one or more I/O devices. The I/O devices may include, for example, one or more user interface devices that facilitate interaction between a user and the server 702 including, but not limited to, a display, a keypad, a pointing device, a control panel, a touch screen display, a remote control device, a microphone, a speaker, a stylus, a camera, an image projector, data storage devices, printing devices, and so forth.

The server 702 may further include one or more network interfaces 716 via which the server 702 may communicate with any of a variety of other systems, platforms, networks, devices, and so forth. Such communication may occur via any of one or more of the network(s) 708.

The user device(s) 704 may include a display, a touch sensor, one or more processors, one or more memories, persistent data storage, input/output interface(s), network interface(s), and so forth. In certain example embodiments, a user device 704 may be configured for stationary use within a particular environment.

In an illustrative configuration, the user device 704 may include one or more processors (processor(s)) 734, one or more memory devices 736 (generically referred to herein as memory 736), one or more input/output ("I/O") interface(s) 738, one or more network interfaces 740, and data storage 742. The user device 704 may further include one or more buses 744 that functionally couple various components of the user device 704. The data storage 742 may store one or more operating systems (O/S) 746; one or more database management systems (DBMS) 748; and one or more program modules, applications, or the like such as, for example, one or more text analysis modules 750, one or more application functionality correlation modules 752, one or more application modules 754, and one or more application execution status modules 756. Any of the modules depicted as part of the user device 704 in FIG. 7 may include computer-executable code, instructions, or the like that may be loaded into the memory 736 for execution by one or more of the processor(s) 734. Each module depicted as part of the user device 704 may enable similar functionality as described earlier in connection with similarly named modules. Further, any of the functionality associated with any of the program modules depicted as part of the server 702 may be distributed, at least partially, between the server 702 and the user device 704. Further, any of the illustrative components of the user device 704 may correspond in type and/or function to correspondingly named components of the server 702.

In addition, although not depicted in FIG. 7, the user device 704 may further include one or more antennas such as, for example, a cellular antenna for transmitting or receiving signals to/from a cellular network infrastructure, a Wi-Fi antenna for transmitting or receiving Wi-Fi signals to/from a wireless access point, an antenna for receiving GNSS signals from a GNSS satellite, a Bluetooth antenna for transmitting or receiving Bluetooth signals, and one or more other antennas such as, for example, a Near Field Communication (NFC) antenna for transmitting or receiving NFC signals. In certain example embodiments, such antenna(s) may include a shared antenna capable of transmitting and receiving data using multiple different wireless communication standards.

Such antenna(s) may include any suitable type of antenna depending, for example, on the communications protocols used to transmit or receive signals via the antenna(s). Non-limiting examples of suitable antennas may include directional antennas, non-directional antennas, dipole antennas, folded dipole antennas, patch antennas, multiple-input multiple-output (MIMO) antennas, or the like.

Such antenna(s) may be communicatively coupled to one or more radios to which or from which signals may be transmitted or received. The radio(s) may include any suitable component(s) for, in cooperation with the antenna(s), transmitting or receiving RF signals in the bandwidth and/or channels corresponding to the communications protocols utilized by the user device 704 to communicate with other devices. The radio(s) may include hardware, software, and/or firmware for modulating, transmitting, or receiving—potentially in cooperation with any of antenna(s)—communications signals according to any of the communications protocols discussed above including, but not limited to, one or more Wi-Fi and/or Wi-Fi direct protocols, as standardized by the Institute of Electrical and Electronics Engineers (IEEE) 802.11 standards, one or more Bluetooth protocols, or one or more cellular communications protocols or standards. Such radio(s) may further include hardware, firmware, or software for receiving GNSS signals from a corresponding antenna. Such radio(s) may include any known receiver and baseband suitable for communicating via the communications protocols utilized by the user device 704. Such radio(s) may further include a low noise amplifier (LNA), additional signal amplifiers, an analog-to-digital (A/D) converter, one or more buffers, digital baseband, or the like.

It should be appreciated that the program modules, applications, computer-executable instructions, code, or the like depicted in FIG. 7 as being stored in the data storage 718 and the data storage 742 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the server 702, locally on the user device 704, and/or hosted on other computing device(s) accessible via one or more of the network(s) 708, may be provided to support functionality provided by the program modules, applications, or computer-executable code depicted in FIG. 7 and/or additional or alternate functionality. Further, functionality may be modularized differently such that processing described as being supported collectively by the collection of program modules depicted in FIG. 7 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 5 may be implemented, at least partially, in hardware and/or firmware across any number of devices.

It should further be appreciated that any of the components of the networked architecture 700 may include alternate and/or additional hardware, software, or firmware components beyond those described or depicted without departing from the scope of the disclosure. More particularly, it should be appreciated that software, firmware, or hardware components depicted as forming part of the server 702 and/or the user device 704 are merely illustrative and that some components may not be present or additional components may be provided in various embodiments. While various illustrative program modules have been depicted and described as software modules stored in data storage 718 or the data storage 742, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the method 600 described above may be performed by one or more program modules, applications, or the like executing on the server 702 or by one or more program modules, applications, or the like executing on one or more user devices 704. It should further be appreciated that any of the operations of the method 600 may be performed, at least in part, in a distributed manner by one or more servers 702 and one or more user devices 704, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the method 600 may be performed in the context of the illustrative configuration of the server 702 and/or the illustrative configuration of the user device 704 depicted in FIG. 7, it should be appreciated that such operations may be implemented in connection with numerous other device configurations.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
   receiving a first indication of handwritten text detected on a writing surface associated with a user device;
   determining that the handwritten text includes two or more indicators comprising at least one of a content type indicator associated with a type of content included in the handwritten text;
   determining, based at least in part on a first indicator and a second indicator of the two or more indicators, a first application functionality, wherein determining the first application functionality comprises:
      determining, based at least in part on the first indicator, two or more application functionalities; and
      determining, based at least in part on the second indicator, the first application functionality of the two or more application functionalities; and
   executing the first application functionality.

2. The method of claim 1, wherein determining that the handwritten text includes the two or more indicators further comprises determining that the handwritten text includes a content layout indicator associated with a layout of the handwritten text, the content layout indicator being a graphical indicator, the method further comprising:
   determining that the handwritten text includes a first text line;
   determining that the graphical indicator is associated with the first text line;
   determining that the first text line is a title corresponding to a listing of content elements; and
   determining that one or more additional text lines represent the listing of content elements.

3. The method of claim 2, wherein determining that the handwritten text includes the two or more indicators further comprises determining that the first text line includes the content type indicator, the content type indicator being a keyword, wherein determining the first application functionality to execute comprises determining the first application functionality based at least in part on an association between the first application functionality and the keyword, and wherein executing the first application functionality comprises:
   determining that the listing of content elements is a listing of items;
   determining that a first additional text line of the one or more additional text lines represents a first item in the listing of items;
   determining a first product that corresponds to the first item; and
   sending a second indication of an execution result, wherein the second indication of the execution result comprises a third indication of the first product.

4. The method of claim 3, wherein executing the first application functionality further comprises:
   determining historical data associated with a user profile, the historical data indicating that the first product was selected for acquisition during a prior application session; and
   automatically initiating an order for the first product, wherein the third indication of the first product comprises a fourth indication that the order for the first product was initiated.

5. The method of claim 3, further comprising:
   sending a third indication of the listing of items to a mobile device;
   receiving, from a mobile application executing on the mobile device, a fourth indication of a user selection associated with a second item in the listing of items, receiving the fourth indication of the user selection comprising receiving a fifth indication that a second product that corresponds to the second item has been acquired; and
   causing presentation of a sixth indication that the second product has been acquired on the writing surface in association with a second additional text line of the one or more additional text lines that represents the second item.

6. The method of claim 2, wherein determining that the handwritten text includes the two or more indicators further comprises determining that the first text line includes the content type indicator, the content type indicator being a keyword, wherein determining the first application functionality to execute comprises determining the first application functionality based at least in part on an association between the first application functionality and the keyword, and wherein executing the first application functionality comprises:
   determining that the listing of content elements is a listing of tasks;
   determining that a first additional text line of the one or more additional text lines represents a first task in the listing of tasks;
   determining a first executable application that corresponds to the first task; and
   performing the first task using the first executable application; and
   sending a second indication of an execution result, wherein the second indication of the execution result comprises a third indication that the first task has been completed.

7. The method of claim 1, wherein determining that the handwritten text includes the two or more indicators comprises determining that the handwritten text includes an application function indicator associated with an application function to be performed, the application function indicator being a search function indicator, the method further comprising:
   determining that the handwritten text includes a first text line; and
   determining that the search function indicator is associated with the first text line,
   wherein executing the first application functionality comprises:
      generating a search query based at least in part on one or more words included in the first text line; and
      executing the search query to obtain an execution result, the execution result being a set of search results.

8. The method of claim 1, further comprising causing an indication that the first application functionality is being executed to be displayed on the writing surface in association with the at least a portion of the handwritten text.

9. The method of claim 1, further comprising receiving an execution result associated with executing the first application functionality.

10. The method of claim 1, wherein determining that the handwritten text includes the two or more indicators comprises determining that the handwritten text includes one or more text lines extending in a direction, wherein the one or more text lines comprise a first text line extending in the direction and a second text line below the first text line and extending in the direction, wherein determining that the handwritten text includes one or more indicators further comprises determining that the second text line extends substantially in the direction.

11. An electronic device, comprising:
at least one memory storing computer-executable instructions; and
at least one processor operatively coupled to the at least one memory, wherein the at least one processor is configured to execute the computer-executable instructions to:
receive image data associated with a writing surface, the image data including a representation of handwritten text;
determine that the handwritten text includes two or more indicators comprising at least one of a content type indicator indicating a type of content included in the handwritten text;
determine, based at least in part on a first indicator and a second indicator of the two or more indicators, a first application functionality, wherein determining the first application functionality comprises:
determining, based at least in part on the first indicator, two or more application functionalities; and
determining, based at least in part on the second indicator, the first application functionality of the two or more application functionalities; and
execute the first application functionality.

12. The electronic device of claim 11, further comprising an image capture device configured to generate the image data, wherein the image data is representative of an image of the writing surface, and wherein the writing surface is a non-electronic surface that includes the handwritten text.

13. The electronic device of claim 12, wherein the image is a first image, wherein the electronic device is communicatively coupled to an image projector, and wherein the at least one processor is configured to
cause presentation of an execution result on the writing surface by executing the computer-executable instructions to send a signal to the image projector that causes the image projector to project a second image on the writing surface, the second image including an indication of the execution result.

14. The electronic device of claim 12, further comprising receiving an execution result associated with executing the first application functionality.

15. The electronic device of claim 11, wherein the at least one processor is configured to determine that the handwritten text includes the two or more indicators by executing the computer-executable instructions to:
send the image data to a remote system comprising one or more servers, wherein the remote system is configured to detect the handwritten text in the image data and perform natural language processing on the handwritten text to determine the two or more indicators; and
receive, from the remote system, an identification of the two or more indicators; and
wherein the at least one processor is configured to execute the first application functionality by interacting with the remote system.

16. The electronic device of claim 11, wherein the writing surface is an electronic display of the electronic device, and wherein the image data comprises input data detected at the electronic display, the input data being indicative of the handwritten text generated as a result of contact between an input device and the electronic display.

17. An electronic device, comprising:
at least one memory storing computer-executable instructions; and
at least one processor operatively coupled to the at least one memory, wherein the at least one processor is configured to execute the computer-executable instructions to:
receive a first indication of handwritten text detected on a writing surface associated with a user device;
determine that the handwritten text includes two or more indicators comprising at least one of a content type indicator associated with a type of content included in the handwritten text; and
determine, based at least in part on a first indicator and a second indicator of the two or more indicators, a first application functionality to execute, wherein determining the first application functionality comprises:
determining, based at least in part on the first indicator, two or more application functionalities; and
determining, based at least in part on the second indicator, the first application functionality of the two or more application functionalities; and
execute the first application functionality.

18. The electronic device of claim 17, wherein to determine that the handwritten text includes the two or more indicators comprises to determine that the handwritten text includes a content layout indicator associated with a layout of the handwritten text, the content layout indicator being a graphical indicator, wherein the at least one processor is further configured to execute the computer-executable instructions to:
determine that the handwritten text includes a first text line;
determine that the graphical indicator is associated with the first text line;
determine that the first text line is a title corresponding to a listing of content elements; and
determine that one or more additional text lines represent the listing of content elements.

19. The electronic device of claim 18, wherein determine that the handwritten text includes the two or more indicators further comprises determining that the first text line includes the content type indicator, the content type indicator being a keyword, wherein determine the first application functionality to execute comprises determining the first application functionality based at least in part on an association between the first application functionality and the keyword, and wherein to execute the first application functionality comprises to:
determine that the listing of content elements is a listing of items;
determine that a first additional text line of the one or more additional text lines represents a first item in the listing of items;
determine a first product that corresponds to the first item; and
send a second indication of an execution result, wherein the second indication of the execution result comprises a third indication of the first product.

20. The electronic device of claim 19, wherein to execute the first application functionality further comprises to:
determine historical data associated with a user profile, the historical data indicating that the first product was selected for acquisition during a prior application session; and
automatically initiate an order for the first product, wherein the third indication of the first product comprises a fourth indication that the order for the first product was initiated.

\* \* \* \* \*